May 1, 1962
R. BACCHI
3,031,899
ELECTRO-MANUAL OPERATOR
Filed Aug. 25, 1958
3 Sheets-Sheet 1
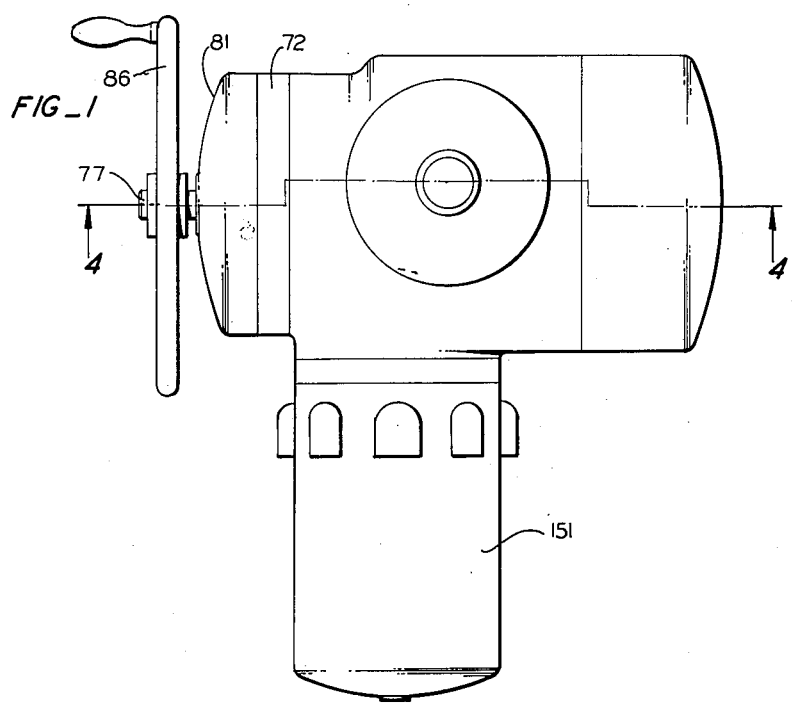
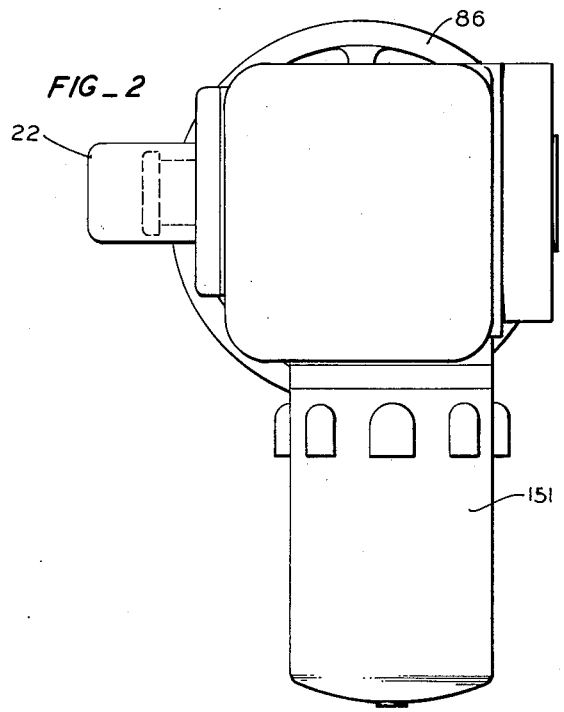
INVENTOR.
RAY BACCHI
BY Lathrop & West
ATTORNEYS

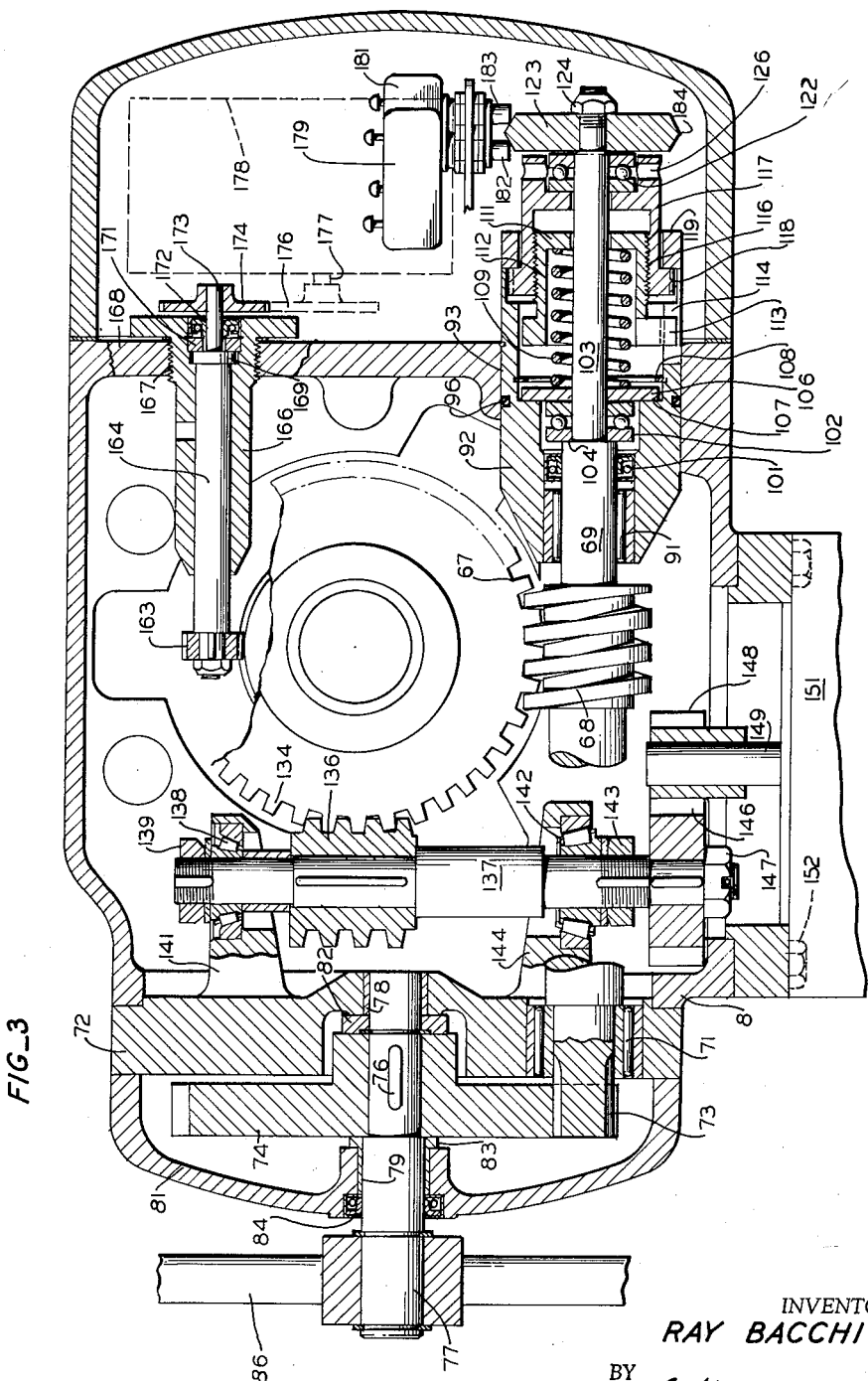

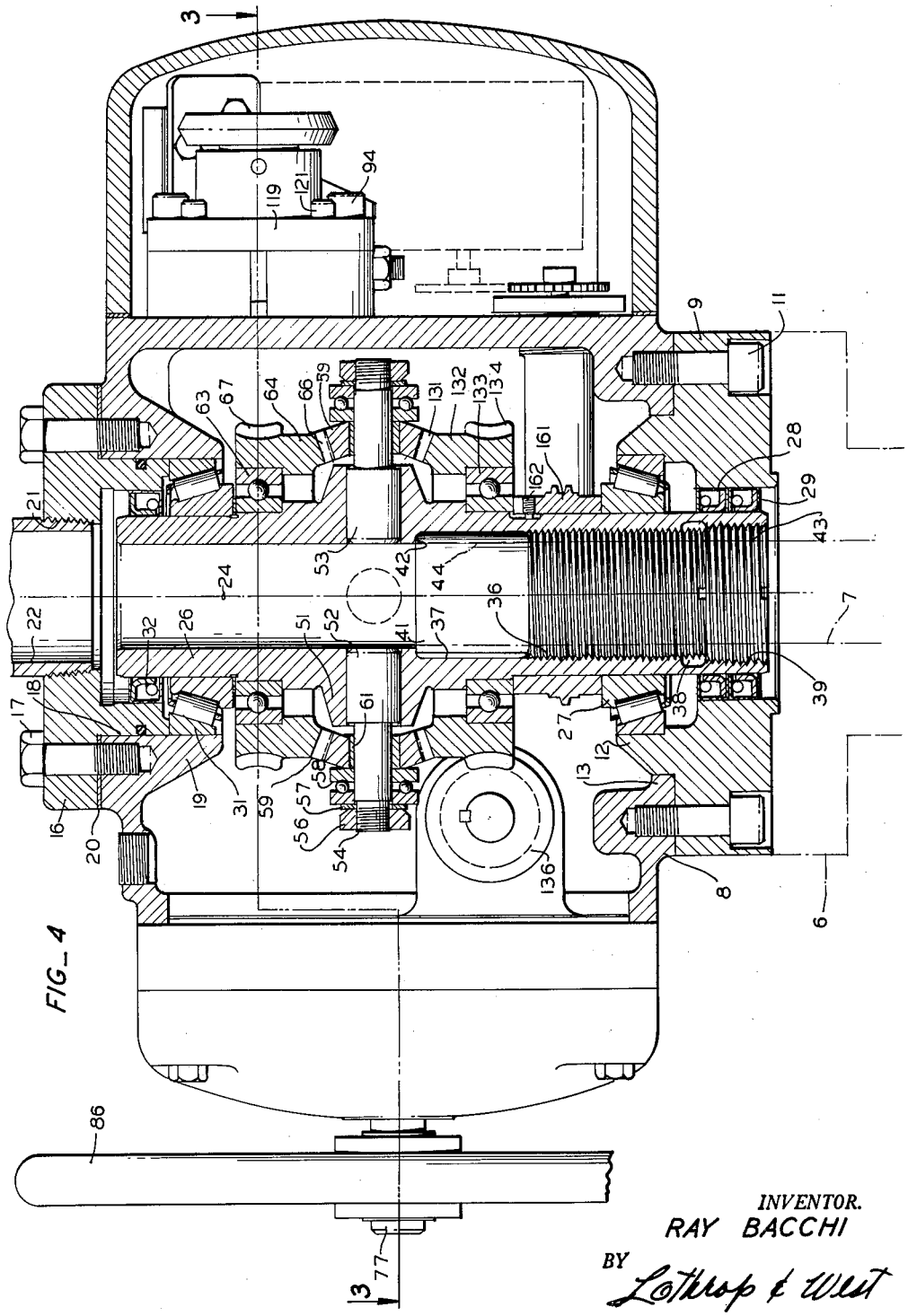

United States Patent Office 3,031,899
Patented May 1, 1962

3,031,899
ELECTRO-MANUAL OPERATOR
Ray Bacchi, Daly City, Calif., assignor to Baldwin-Lima-Hamilton Corporation, a corporation of Pennsylvania
Filed Aug. 25, 1958, Ser. No. 757,035
1 Claim. (Cl. 74—626)

My invention relates to means for applying either electrical power or hand power or both to a device to be operated; for example, a valve having a threaded, rising stem. Devices of this sort are used for applying either manual or electrical power to various devices, an example being shown in my copending application entitled, Valve Operator, Serial No. 620,609, filed November 6, 1956, and assigned to the assignee hereof.

It is a general object of the invention to provide an improved electro-manual operator and one which can be readily fabricated and economically sold.

Another object of the invention is to provide an arrangement of parts which is considerably simplified over previous operators of this type and which can, therefore, be readily assembled and disassembled for service.

A further object of the invention is to provide an operator which is reduced in size and weight so that it can more readily be installed and can be more readily adapted to operate devices of different sorts.

A still further object of the invention is to provide an electro-manual operator in which the controlling instrumentality is generally separated from the remaining part of the mechanism yet is readily adjusted and attended to.

A further object of the invention is to provide an electro-manual operator so arranged that anti-friction bearings can readily be incorporated and so that the various parts of the operator can be readily installed and withdrawn.

Other objects, together with the foregoing, are attained in the embodiment of the invention described in the accompanying description and illustrated in the accompanying drawings, in which:

FIGURE 1 is a plan of an electro-manual operator constructed in accordance with the inventtion.

FIGURE 2 is a side elevation of the electro-manual operator.

FIGURE 3 is a cross-section to an enlarged scale, the planes of section being indicated by the lines 3—3 of FIGURE 4.

FIGURE 4 is a cross-section to the same enlarged scale, the plane of section being indicated by the line 4—4 of FIGURE 1.

While the electro-manual operator of the invention can be installed to operate a number of different devices, it is especially adapted as shown herein to be installed on the flange 6 of a diagrammatically represented valve which has a rising, threaded stem 7. Suitably secured to the flange 6 is a part of the operator housing 8. The housing is comprised of a number of different portions, some of which are removable, but generally constitutes a substantially hollow, compact box. What is in most installations the lower portion of the box is closed by a bottom closure plate 9 removably held in position by fastenings 11 and having a collar 12 piloted into or encompassed by an internal rim 13 of the housing.

Somewhat similarly, the housing 8 is at its opposite (usually upper) end closed by a removable top closure 16 secured in position by fasteners 17 and having a body 18 piloted into or surrounded by an internal flange 19 or collar projecting inwardly into the hollow interior of the housing 8 and sealed with an O ring. Since the housing is intended as a lubricant container, the flange of the bottom closure plate 9 is tightly pressed against the housing to preclude leakage, preferably with an intermediate gasket, not shown. Also, since the distance between the closures 9 and 16 varies slightly under different assembly and operating circumstances the top plate 16 is preferably provided with one or more removable shims 20. The closure 16 is finished with a threaded opening 21 into which a removable cover 22 is inserted. This is of any length and configuration necessary to adapt the operator to its particular environment, particularly the upper portion of the valve stem.

Extending across the interior of the housing 8 along a transverse axis 24 is a hollow output spindle 26. At its lower end the spindle is carried in a tapered roller bearing 27 interposed between the spindle and the lower closure 9. Suitable lubricant seals 28 and 29 are placed to avoid lubricant leakage. At its upper end the output spindle is carried by a tapered roller bearing 31 interposed between the spindle and the interior collar 19 of the housing. An upper lubricant seal 32 is properly positioned to preclude leakage between the upper end of the spindle and the closure plate 16.

The hollow spindle 26 on its interior and adjacent the lower end thereof is provided with a threaded portion 36. This is of a predetermined diameter at one end and opens into an enlarged portion 37. At the other end the portion 36 opens into a groove 38. Disposed near the groove is another threaded portion 39 of a somewhat greater diameter.

In a practical installation, a special driving sleeve 41 is threaded into the portion 36 and abuts a shoulder 42 at one end of the recess 37 being thus forced into firm engagement for most of its threaded length with the thread 36. After the sleeve 41 has been tightly seated against the shoulder 42 it is locked in position by a locking sleeve 43 in engagement with the threads 39 and abutting the sleeve 41. The threads in the threaded portion 36 and the threads in the threaded portion 39 are preferably of opposite hand.

The interior of the sleeve is provided with appropriate threads, indicated by the dotted lines 44, to mate with the corresponding threads on the valve stem 7 diagrammatically illustrated. Since the stem 7 can pass entirely through the hollow output spindle, the operator can be adapted to any one of a number of different valves merely by changing the sleeve 41 and without in any wise altering the spindle 26. When the spindle and adapter or driving sleeve 41 and the locking sleeve 43 are in position, the entire unit rotates in unison about the axis 24 within the bearings 27 and 31.

The hollow output spindle 26 is especially contoured adjacent its central portion to provide a peripheral enlargement 51 at appropriate circumferential points (three in this instance—one being drawn out of position for clarity of illustration) being bored out to provide accommodation for a corresponding number of radial spider shafts 52 and 53. These shafts are enlarged at their radially inner ends and are forced firmly into the enlargement 51 so that they are permanently held in position. Although they are usually not made integral with the output spindle, after initial assembly they are to all intents and purposes substantially one piece therewith.

Since the spider shafts 52 are all identical, a description of one applies equally to the others. For example, the spider shaft 52 at its radially outermost end is provided with threads 54 to receive an enlarged nut 56 adapted to abut a tab lock washer 57 and a thrust bearing 58. The bearing 58 is for the purpose of receiving the radially outward or axial end thrust of a bevel spider gear 59 carried on a needle bearing 61 surrounding the intermediate part of the spider shaft 52. The spider shaft 53 and the others are similarly equipped.

The output spindle 26 also carries adjacent its upper end a radial anti-friction bearing 63 serving as the mounting for a first side ring 64 surrounding the output spindle and rotatable on the bearing 63 about the axis 24. The first side ring 64 is provided with an integral, first bevel gear 66, the teeth of which mesh with the teeth of all of the various spider bevel gears 59.

Integrally formed also with the first side ring 64 is a first worm gear 67 disposed substantially radially outward of the bearing 63 and adapted to be in mesh with a first worm 68 (FIGURE 3). A shaft 69, generally referred to as a torque shaft, carries the worm 68.

The shaft 69 itself is mounted not only for rotation about its own longitudinal axis but also for translational movement along that axis. On opposite sides of the worm 68 the shaft is carried in longitudinally displaceable anti-friction bearings. To one side there is provided a needle bearing 71 mounted in an end plate 72 fastened removably to the housing 8. Peripheral teeth of a spur gear 73 are cut in the end of the torque shaft 69 and are in mesh with an operating gear 74 fastened by a key 76 to a hand shaft 77. When the gear 73 is larger, it is made separately and keyed on the shaft 69.

One end of the shaft 77 is carried in a bushing 78 mounted in the end plate 72 while another part of the shaft 77 is disposed in a bushing 79 mounted in a cover 81 secured to the housing 8. There is a locating washer 82 on one side of the gear 74 and the bushing 79 has a locating flange 83 on it so that the gear is properly positioned. A grease seal 84 precludes leakage between the interior of the cover 81 and the exterior thereof.

The projecting, outward end of the hand shaft 77 carries an appropriately fastened hand operating wheel 86 so that upon rotation of the wheel 86 the shaft 77 is comparably rotated. Because of the difference in pitch diameter of the gears 73 and 74, the hand wheel is effective to rotate the torque shaft 69 at a relatively high speed.

The other end of the torque shaft 69 is mounted in a needle bearing 91 carried in a sleeve 92 slidably inserted into an appropriate opening 93 in one side of the housing 8 and secured therein by appropriate fastenings 94 (FIGURE 4). An O ring 96 precludes leakage along the sleeve 92 from the interior of the housing to the exterior thereof. The sleeve 92 and all attendant parts joined with it can be introduced into position in the housing very readily and can as readily be withdrawn therefrom. With this mounting, the torque shaft 69 is free to be revolved by the hand wheel 86 and also to move endwise under any displacing forces since the needle bearings 71 and 91 permit such free endwise movement and the spur pinion 73 meshing with the spur gear 74 likewise accommodates such endwise movement.

The end thrust exerted upon the torque shaft 69 by interaction of the worm 68 and the worm gear 67 is resiliently resisted so that until a predetermined torque is exceeded the shaft 69 is virtually fixed as to its endwise location and is free to rotate. An appropriate torque responsive mechanism, resilient in character, is entirely mounted on and within the sleeve 92 so that the entire mechanism, including the shaft 69, can be constructed and handled as a sub-assembly and can be assembled and disassembled as a unit with respect to the remaining mechanism.

Within the hollow sleeve 92 and adjacent the bearing 91 there is disposed a lubricant seal 101. This precludes leakage along the shaft 69 and is situated between the bearing 91 and an end thrust bearing 102 surrounding a reduced portion 103 of the torque shaft 69 and abutting a shoulder 104 thereon. The thrust bearing 102 is also in contact with an enlarged thrust washer 106 designed to rest against a shoulder 107 within the sleeve 92 and movable axially but to a limited extent as defined by a removable snap ring 108.

Pressing against the thrust washer 106 is a coil spring 109 at its other end pressing against an inturned flange 111 of a cup 112. The cup is circular in cross-section throughout except that at one portion it is provided with a radial tongue 113 slidably disposed in a lateral slot 114 in the side of the sleeve 92.

With this arrangement the cup 112 is free to move longitudinally within the sleeve 92 but cannot rotate therein because of the engagement of the tongue 113 with the walls of the slot 114. The external portion of the cup 112 is provided with threads 116 engageable by comparable threads on the interior of a shroud 117. At one end the shroud 117 has an enlarged flange 118 receivable within the enlarged interior of the sleeve 92, the enlarged flange being held rotatably in position by a cover plate 119 secured by removable fasteners 121 (FIGURE 4).

Appropriately mounted in the shroud 117 is an end thrust bearing 122 which not only abuts the shroud but also lies against an actuating cam disc 123 mounted on the end of the reduced portion 103 of the torque shaft 69, being held by a removable lock nut 124.

With this arrangement, the shaft 69 and its reduced extension 103 and the cam disc 123 and the nut 124 all rotate together and carry with them the immediately adjacent portions of the thrust bearings 102 and 122. The intervening mechanism, such as the spring 109, is not necessarily rotated. In order to adjust the spring an appropriate tool is introduced into successive ones of a number of radial holes 126 in the shroud 117 and the shroud is rotated in the proper direction. Since the shroud is in threaded engagement with the cup 112 but since the cup is precluded from rotating by the tongue 113, the relative position of the cup flange 111 with respect to the thrust washer 106 is varied.

When the shaft 69 has substantial end thrust toward the right in FIGURE 3 the thrust bearing 102 displaces the thrust washer 106 against the urgency of the spring 109 which at its other end remains stationary because of the interrelationship of the cup, shroud and sleeve. When there is excessive end thrust in the other direction the shaft 69 moves to the left in FIGURE 3 and the thrust washer 106 remains seated against the shoulder 107 while the flange 111 compresses the spring 109 against the thrust washer. As the spring compresses, the cup and the shroud move with the outer end of the shaft as the tongue 113 is freely slidable in the slot 114.

Rotation of the hand wheel 86 in rotating the worm 68 and rotating the first worm gear 67 also rotates the spider gears 59 and if these have an appropriate resistance rotates the output spindle 26 accordingly. To provide the proper resistance the spider gears 59 are also in mesh with a second bevel gear 131 formed integrally with a second side ring 132 carried on an anti-friction bearing 133 journalled on the output spindle 26 and disposed substantially symmetrical with respect to the first side ring and first bevel gear.

Also integrally formed with the second side ring 132 is a second worm gear 134 in mesh with a second worm 136 (FIGURE 3) carried on a drive shaft 137. On one side of the second worm 136 the shaft 137 is mounted in an anti-friction bearing 138 positioned by a lock nut 139. The bearing is disposed in a bracket 141 projecting into the interior of the housing from the end plate 72. On the other side of the second worm 136 the shaft 137 is similarly mounted in an anti-friction bearing 142 positioned by a locking nut 143. The bearing 142 is carried in a bracket 144 extending inwardly into the housing from the end plate 72.

At one end, the drive shaft is provided with a removable pinion 146 secured in position by a nut 147. The arrangement and proportions of the parts are such that when the end plate 72 is removed from the housing 8, the drive shaft 137 together with its bearings and the second worm 136 and the pinion 146 are all removable as a unit. This is accomplished after the end plate 72 has been unfastened by partly rotating the end plate and swinging the pinion gear 146 out through the remaining opening.

When assembled, the pinion 146 is in mesh with an end gear 148 carried on the shaft 149 of an electric motor 151 secured to the housing by fastenings 152.

Since various different sizes and styles of electric motors are to be utilized in connection with the operator, the gears 148 and 146 are readily changed to appropriate sizes and ratios.

In accordance with the invention advantage is taken of the endwise movement of the shaft 69 under various torque conditions to control the operation of the electric motor 151 primarily so that the motor will not at any time be overloaded. Also, provision is made for stopping the motor 151 at either end or both ends of the longitudinal movement of the valve stem 7. For that reason there is mounted on the output spindle 26 a driving gear 161 interposed between the bearing 133 and the bearing 27. The gear 161 is locked to the spindle by a fastening 162 so that it rotates therewith.

Meshing with the gear 161 is a driven gear 163 carried on one end of a shaft 164 mounted in a tube 166. This has threads 167 so that the tube is engageable with the internally threaded opening in the end wall 168 of the housing 8. A ring 169 on the shaft 164 takes care of end thrust inasmuch as it abuts a shoulder on the interior of the tube and also abuts a washer 171 appropriately held in place. A lubricant seal 172 precludes leakage.

The outboard end of the shaft 164 is provided with a reduced portion 173 carrying a transfer gear 174 meshing with another transfer gear 176 operating a drive shaft 177 extending into an electrical control instrumentality 178. This latter is not illustrated herein in detail but contains mechanism to operate switches controlling the circuit to the motor 151 whenever the shaft 177 (as well as the output spindle 26) has made a predetermined number of revolutions. This affords an accurate indication of the extreme positions of the valve stem 7.

Also included in the motor circuit and preferably mounted as part of the mechanism 178 are control switches 179 and 181, positioned to have their responsive members 182 and 183 normally disposed on either side of the central ridge 184 of the cam disc 123.

In the operation of this structure when the motor 151 is energized and the valve stem 7 is in an intermediate position, the spider mechanism is operated to turn the output spindle, the reaction being taken on the torque shaft 69. This is yieldingly moved endwise in one direction or the other as soon as the torque exceeds values which will displace the spring 109. Sufficient displacement of the shaft extension 103 in either direction causes the cam disc 123 to move the actuators 182 or 183 to open the circuit to the motor 151. In this way the motor is protected against torque overloads in either direction of operation. As long as the torque is under a predetermined value the motor continues to operate as otherwise controlled. The particular value of torque at which overload occurs can be varied by adjusting the shroud 117.

When the shaft 177 has been revolved into a pre-set position, switches (not shown) in the circuit of the motor 151 are opened so that the motor is stopped at the ends of its stroke.

What is claimed is:

An electro-manual operator comprising a housing, an output spindle, means for rotatably mounting said output spindle in said housing, a plurality of spider shafts fixedly mounted in and projecting radially from said output spindle, bevel spider gears rotatable on said spider shafts, thrust bearings interposed between said spider gears and said spider shafts, a first side ring, means for journalling said first side ring on said output spindle, a first bevel gear on said first side ring and meshing with said spider gears, a first worm gear on said first side ring, a torque shaft, a first worm on said torque shaft meshing with said first worm gear, means for mounting said torque shaft for rotation and axial translation in said housing, means for yieldingly resisting said translation in both directions, a cam disc fixed on said torque shaft, electrical switch means on said housing and engageable by said cam disc, manual rotating means mounted on said housing for rotation and against axial translation, means for rotatably coupling said manual rotating means and said torque shaft, a second side ring, means for journalling said second side ring on said output spindle, a second bevel gear on said second side ring and meshing with said spider gears, a second worm gear on said second side ring, a drive shaft, a second worm on said drive shaft meshing with said second worm gear, means for mounting said drive shaft for rotation in said housing, and electrical means on said housing and controlled by said electrical switch means for rotating said drive shaft.

References Cited in the file of this patent

UNITED STATES PATENTS

| | | |
|---|---|---|
| 1,948,709 | Hackethal | Feb. 27, 1934 |
| 2,005,891 | Elberty | June 25, 1935 |
| 2,028,696 | Beckewith | Jan. 21, 1936 |
| 2,506,999 | De La Rose et al. | May 9, 1950 |

FOREIGN PATENTS

| | | |
|---|---|---|
| 610,746 | Great Britain | Oct. 20, 1948 |